US012747845B2

(12) United States Patent
Sasajima

(10) Patent No.: US 12,747,845 B2
(45) Date of Patent: Sep. 29, 2026

(54) PROJECTION DEVICE FOR VEHICLES

(71) Applicant: Nippon Seiki Co., Ltd., Niigata (JP)

(72) Inventor: Ikuyo Sasajima, Niigata (JP)

(73) Assignee: Nippon Seiki Co., Ltd., Niigata (JP)

( * ) Notice: Subject to any disclaimer, the term of this patent is extended or adjusted under 35 U.S.C. 154(b) by 0 days.

(21) Appl. No.: 19/341,377

(22) Filed: Sep. 26, 2025

(65) Prior Publication Data

US 2026/0117952 A1 Apr. 30, 2026

(30) Foreign Application Priority Data

Oct. 31, 2024 (JP) ................................ 2024-191494

(51) Int. Cl.
*F21W 103/60* (2018.01)
*F21S 45/70* (2018.01)

(52) U.S. Cl.
CPC .......... *F21S 45/70* (2018.01); *F21W 2103/60* (2018.01)

(58) Field of Classification Search
CPC ........ B60Q 2300/32; B60Q 3/44; B60Q 3/12; B60Q 2400/50; B60Q 1/268
USPC ........................................................ 362/503
See application file for complete search history.

(56) References Cited

U.S. PATENT DOCUMENTS 1,929,298 A * 10/1933 Wessels ................. B60J 3/0291
359/601
2,089,596 A * 8/1937 Buhr ....................... G09F 3/203
40/911
2,264,477 A * 12/1941 Loeffler ................. B60Q 1/268
248/205.5
3,630,567 A * 12/1971 Cook ..................... B60J 3/0291
296/97.2
2022/0185177 A1* 6/2022 Baker .................... B60Q 1/268

FOREIGN PATENT DOCUMENTS

JP 2004-9829 A 1/2004

* cited by examiner

*Primary Examiner* — Abdulmajeed Aziz
(74) *Attorney, Agent, or Firm* — RIMON P.C.

(57) ABSTRACT

A projection device for vehicles for projecting image light from a vehicle to project an image based on the image light onto a road surface outside the vehicle, includes a projection unit that projects the image light. The projection unit is disposed interiorly to a windshield of the vehicle, and projects the image light through the windshield to the outside of the vehicle to project the image onto the road surface outside the vehicle. It is desirable that the image light is transmitted through a wiper wiping area in the windshield.

6 Claims, 9 Drawing Sheets

PROJECTION DEVICE FOR VEHICLES

CROSS-REFERENCE TO RELATED APPLICATIONS

This application claims the benefit of foreign priority to Japanese Patent Application No. 2024-191494 filed on Oct. 31, 2024, the entire contents of each of which are hereby incorporated by reference.

TECHNICAL FIELD

The present disclosure relates to a projection device for vehicles.

BACKGROUND ART

Patent Document 1 discloses a projection device for vehicles that projects image light from a vehicle and projects an image based on the image light onto a road surface outside the vehicle.

PRIOR ART DOCUMENT

Patent Document

Patent Document 1: JP 2004-9829 A

SUMMARY OF INVENTION

Technical Problem

However, in a rainy or snowy condition, rain or snow may adhere to a projection unit of a projection device for vehicles, which may degrade the image quality of an image projected onto a road surface.

An object of the present disclosure is to provide a projection device for vehicles that can suppress degradation of image quality in a rainy or snowy condition.

Solution to Problem

In an aspect, the following solution is provided.

A projection device for vehicles for projecting image light from a vehicle to project an image based on the image light onto a road surface outside the vehicle includes a projection unit that projects the image light. The projection unit is disposed interiorly to a windshield of the vehicle, and projects the image light through the windshield to the outside of the vehicle to project the image onto the road surface outside the vehicle.

Advantageous Effects of Invention

According to the present disclosure, it is possible to provide a projection device for vehicles that can suppress degradation of image quality in a rainy or snowy condition.

BRIEF DESCRIPTION OF DRAWINGS

FIG. 1A is a side view of the vehicle, and FIG. 1B is a plan view of the vehicle.

FIG. 8A is a diagram illustrating a state in which no image is projected, FIG. 8B is a diagram illustrating a state in which a snowy road guide A is projected, and FIG. 8C is a diagram illustrating a state in which a snowy road guide B is projected.

DESCRIPTION OF EMBODIMENTS

Examples will be described in detail below with reference to the accompanying drawings.

Figure 1A:
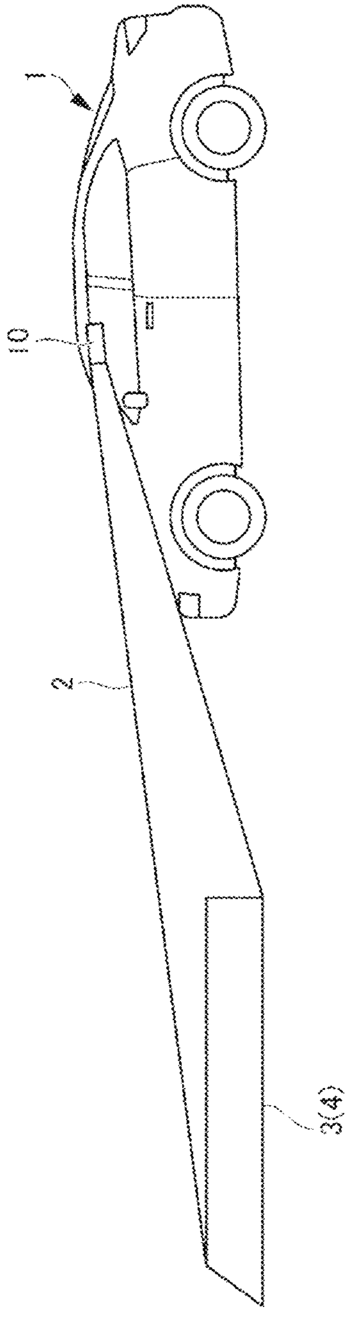
FIGS. 1A and 1B are diagrams illustrating a vehicle equipped with a projection device for vehicles according to an example of the present disclosure.
Figure 1B:
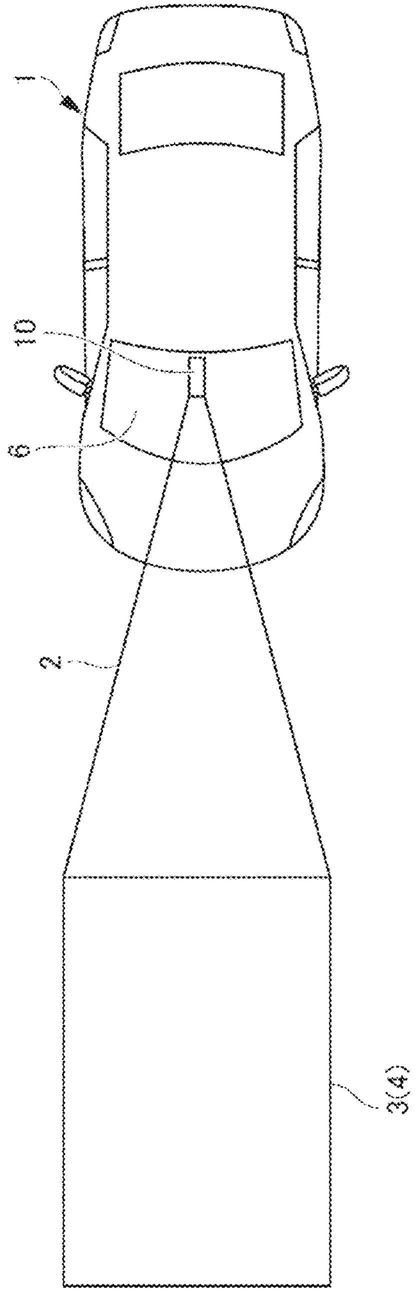
Figure 2:
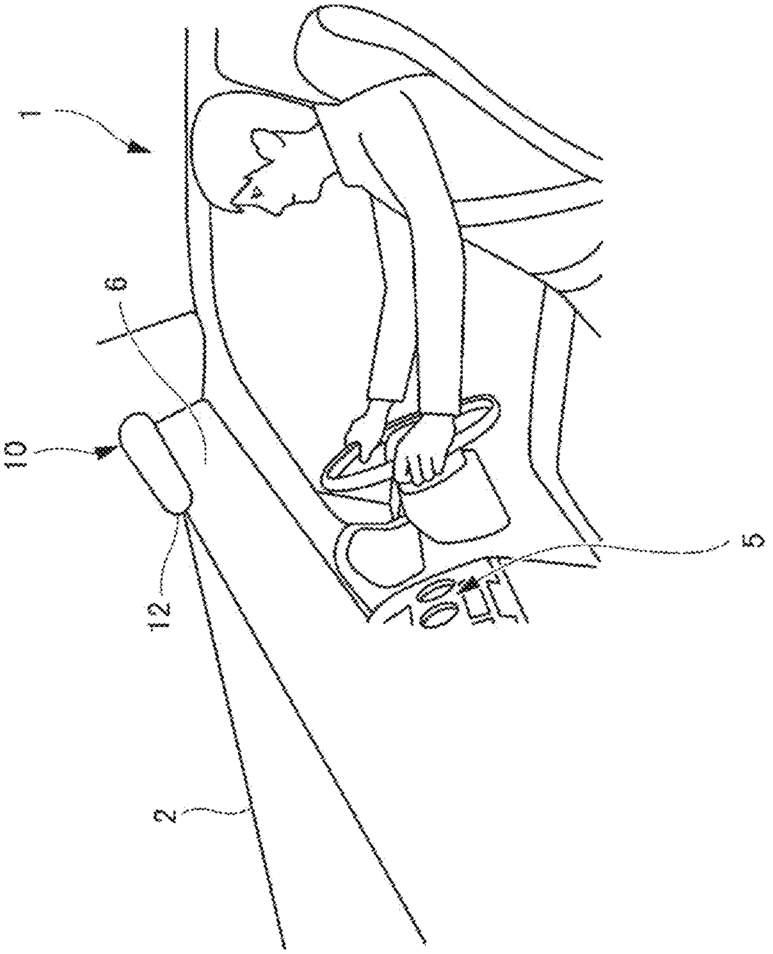
FIG. 2 is a perspective view of the interior of the vehicle in which the projection device for vehicles is disposed.

FIGS. 1A and 1B are diagrams illustrating a vehicle 1 equipped with a projection device for vehicles 10 according to an example of the present disclosure. FIG. 1A is a side view of the vehicle 1, and FIG. 1B is a plan view (a view from above) of the vehicle 1. FIG. 2 is a perspective view of the interior of the vehicle 1 in which the projection device for vehicles 10 is disposed.

As illustrated in FIGS. 1A, 1B, and 2, the projection device for vehicles 10 projects image light 2 from the vehicle 1 to project an image 4 based on the image light 2 (hereinafter, which may also be referred to as a projected image) onto a road surface 3 (a projection area) outside the vehicle 1.

Figure 3:
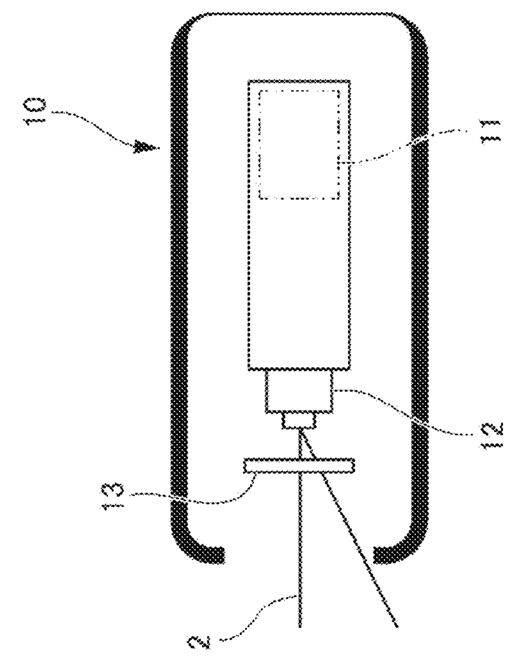
FIG. 3 is a diagram illustrating a schematic configuration of the projection device for vehicles.

FIG. 3 is a diagram illustrating a schematic configuration of the projection device for vehicles 10.

As illustrated in FIG. 3, the projection device for vehicles 10 includes a light source unit 11, a projection unit 12 including a display (not illustrated) that scans light (e.g., LED light or laser light) emitted by the light source unit 11 to form the image light 2, and/or a projection lens (not illustrated) that projects the image light 2, and a polarizing plate 13. In the projection device for vehicles 10 of the example, the light source unit 11 and the projection unit 12 are integrated. However, the light source unit 11 and the projection unit 12 may be separate units and disposed in different locations. For example, the light source unit 11 may be disposed inside an instrument panel 5 of the vehicle 1, and light emitted by the light source unit 11 may be guided to the projection unit 12 via a light guide member such as an optical fiber.

The projection device for vehicles 10 is disposed interiorly to a windshield 6 of the vehicle 1, for example on a ceiling, and projects the image light 2 through the windshield 6 to the outside of the vehicle 1 to project the image 4 onto the road surface 3 outside the vehicle 1. Thus, the projection unit 12 of the projection device for vehicles 10 is protected by the windshield 6, and degradation of the image quality of the projected image 4 caused by adherence of snow or rain can be suppressed.

The windshield 6 may be a front windshield, a rear windshield, or a side windshield. For example, the projection unit 12 is disposed interiorly to and above a front windshield and projects the image 4 onto the road surface 3 in front of the vehicle, but the projection unit 12 may be disposed interiorly to a rear windshield and project the image 4 onto the road surface 3 behind the vehicle. In this case, any information can be notified to a vehicle behind.

The projection unit 12 of the projection device for vehicles 10 is preferably disposed such that the image light 2 is transmitted through a wiper wiping area (not illustrated) in the windshield 6. This makes it possible to more reliably suppress degradation of the image quality of the projected image 4, because a wiper (not illustrated) can wipe away snow or rain adhered to an area of the windshield 6 through which the image light is transmitted.

As illustrated in FIG. 3, the projection unit 12 projects the image light 2 through the polarizing plate 13 (a polarizing filter). This makes it possible to suppress reflection of the image light 2 by the windshield 6, based on the orientation setting of a polarization axis 13*a* of the polarizing plate 13 (see FIG. 7).

Figure 4:
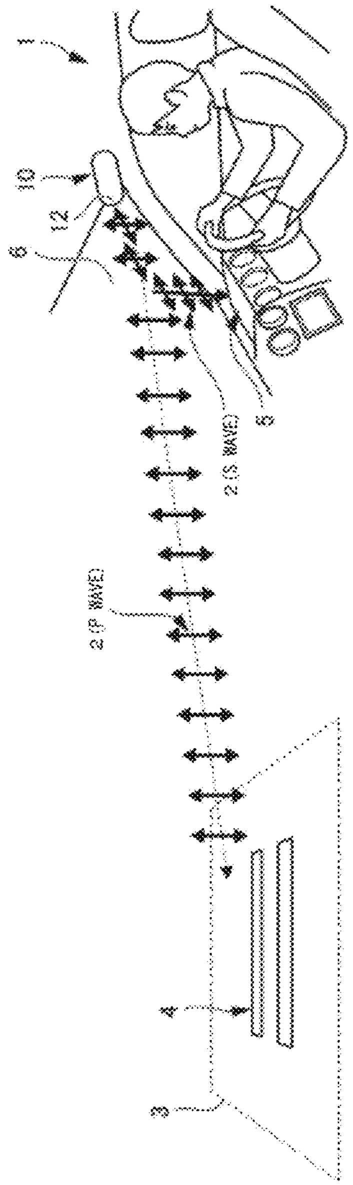
FIG. 4 illustrates image light when not being polarized.

FIG. 4 illustrates the image light 2 when not being polarized by the polarizing plate 13. As illustrated in FIG. 4, the image light 2 projected by the projection unit 12 contains a P wave light component and an S wave light component relative to the windshield 6. The P wave is a light component in the vertical direction (that is approximately the up-down direction of the vehicle 1: light perpendicular to the windshield 6) that is easily transmitted through the windshield 6, and the S wave is a light component in the horizontal direction (that is approximately the left-right direction of the vehicle 1: light parallel to the windshield 6) that is easily reflected by an interior surface of the windshield 6. Therefore, as illustrated in FIG. 4, when the image light 2 is projected from the projection unit 12 without passing through the polarizing plate 13, the P wave component contained in the image light 2 is transmitted through the windshield 6 and projects the image 4 onto the road surface 3. On the other hand, the S wave component contained in the image light 2 is reflected by the windshield 6 and illuminates the instrument panel 5 or the like. The light (including an image) illuminating the instrument panel 5 or the like may be perceived as an eyesore and an annoyance by an occupant of the vehicle 1.

Figure 5:
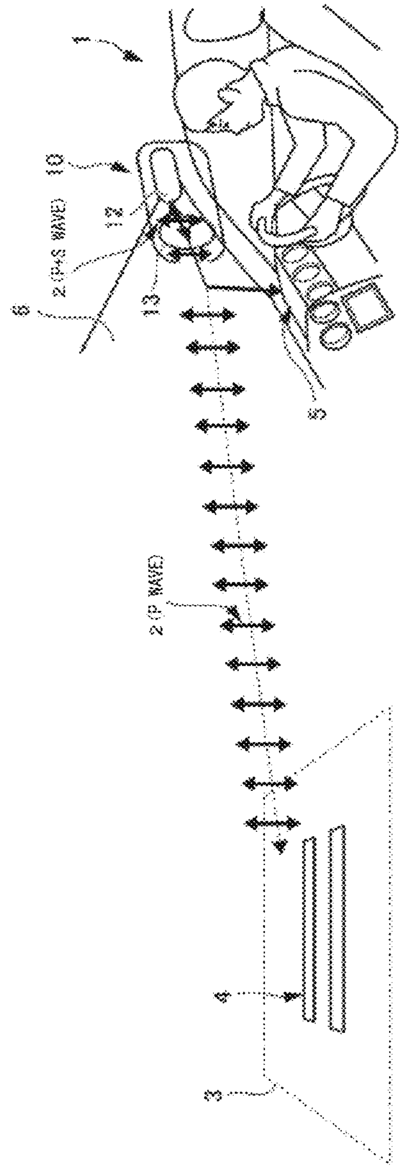
FIG. 5 is a diagram illustrating a case of polarizing image light to provide a P wave relative to a windshield.

FIG. 5 is a diagram illustrating a case of polarizing the image light 2 to provide a P wave relative to the windshield 6.

The polarizing plate 13 illustrated in FIG. 5 is disposed to provide, as polarized image light 2, a P wave relative to the windshield 6.

Specifically, the polarizing plate 13 is disposed such that the polarization axis 13*a* of the polarizing plate 13 is oriented approximately in the up-down direction of the vehicle 1. This makes it possible to remove the S wave light component from the image light 2, and thus to reduce light reflected by the windshield 6 and illuminating the instrument panel 5 or the like.

Figure 6:
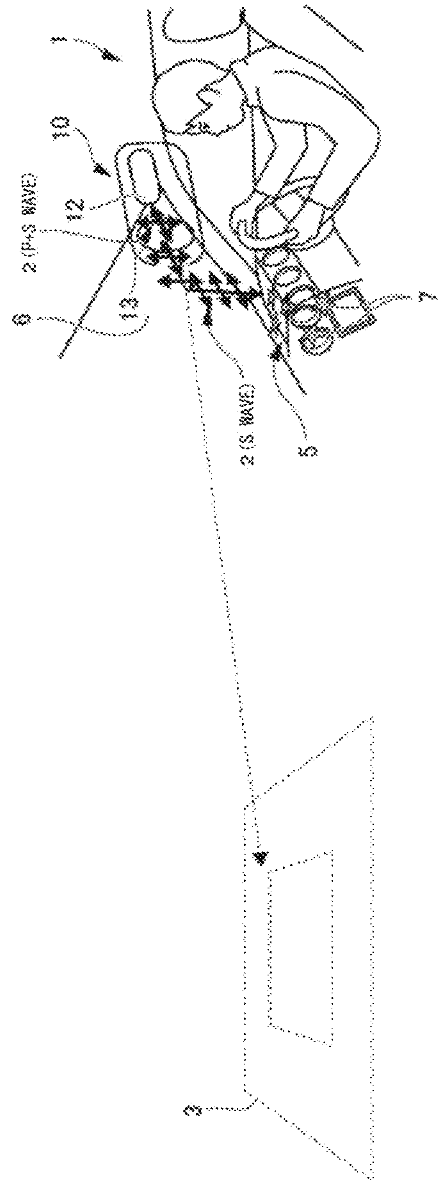
FIG. 6 is a diagram illustrating a case of polarizing image light to provide an S wave relative to the windshield.
Figure 7:
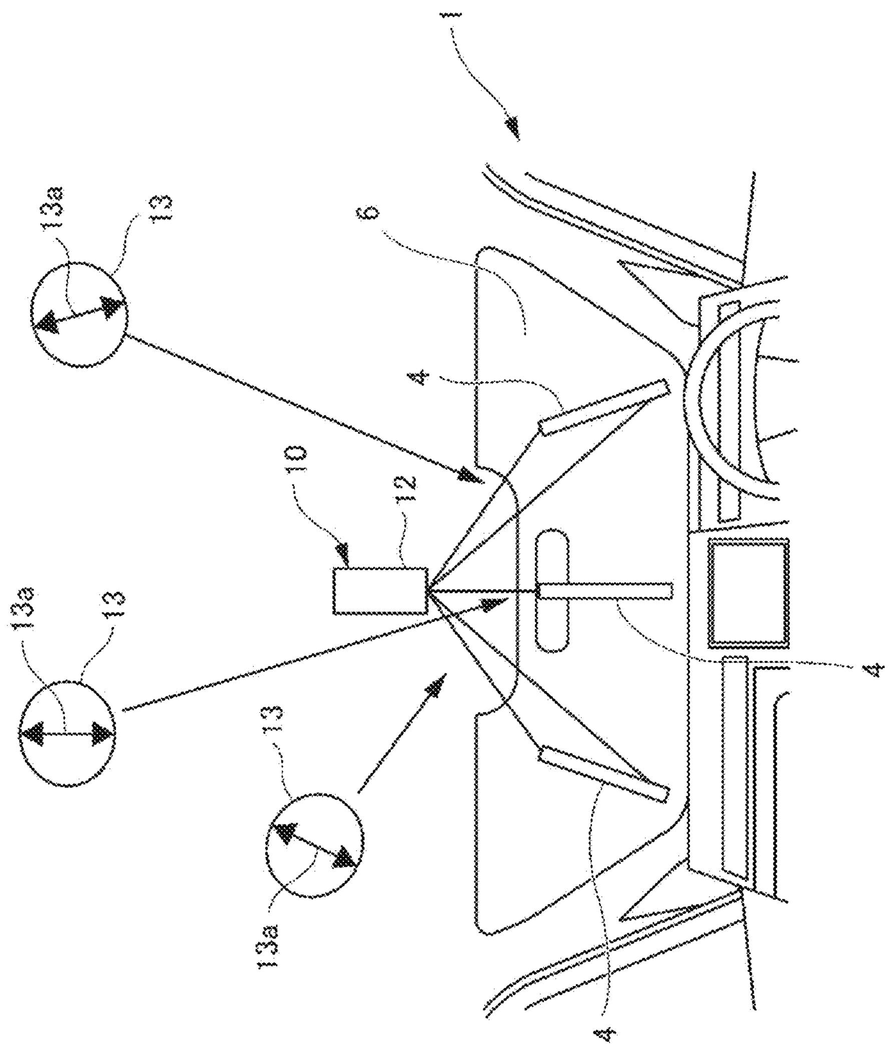
FIG. 7 is a diagram illustrating other examples of adjusting the orientation of the polarization axis.

In the polarizing plate 13 of the example, the orientation of the polarization axis 13*a* can be changed. For example, a mechanism for mechanically rotating the polarizing plate 13 around the optical axis of the image light 2 may be provided, or a polarizing device that can electrically control the orientation of the polarization axis 13*a* may be used. The polarizing plate 13 makes it possible to project an image 7 onto the instrument panel 5, as illustrated in FIG. 6, or to adjust the orientation of the polarization axis 13*a* according to the orientation of the image 4 to be projected onto the road surface 3, as illustrated in FIG. 7. FIGS. 6 and 7 will now be explained.

FIG. 6 is a diagram illustrating a case of polarizing the image light 2 to provide an S wave relative to the windshield 6.

The polarizing plate 13 illustrated in FIG. 6 is switchable between a first polarization state for polarizing the image light 2 to provide a P wave relative to the windshield 6 (see FIG. 5), and a second polarization state for polarizing the image light 2 to provide an S wave relative to the windshield 6. For example, when the polarizing plate 13 is mechanically rotated, in the first polarization state, the polarizing plate 13 is oriented such that the polarization axis 13*a* is oriented approximately in the up-down direction, and in the second polarization state, the polarizing plate 13 is in an orientation rotated approximately 90 degrees such that the polarization axis 13*a* is oriented approximately in the left-right direction. In this case, if it is desired to project the image 4 onto the road surface 3, the polarizing plate 13 can be switched to the first polarization state, to project the image 4 onto the road surface 3 while suppressing reflection of the image light 2 to the instrument panel 5. In addition, if it is not desired to project the image 4 onto the road surface 3, the polarizing plate 13 can be switched to the second polarization state, to cease projecting the image 4 onto the road surface 3 and project, onto the instrument panel 5, the image 7 for instrument panel projection based on the S wave component of the image light 2 reflected by the interior side of the windshield 6. FIG. 6 illustrates a decorative star-shaped design as the image 7 for instrument panel projection. However, the image 7 for instrument panel projection may include not only a decorative element but also information such as vehicle information, navigation information, or the like.

FIG. 7 is a diagram illustrating other examples of adjusting the orientation of the polarization axis 13*a*.

In the example illustrated in FIG. 7, the image 4 having a lane shape along the traveling direction of the vehicle 1 is projected onto one position selected from the front center of the vehicle 1, the front left of the vehicle 1, and the front right of the vehicle 1. Here, the polarization axis 13*a* of the polarizing plate 13 is adjusted to be oriented in a direction along the orientation of the image 4 as viewed from the projection unit 12. For example, when the image 4 is projected onto the front center of the vehicle 1, the polarization axis 13*a* of the polarizing plate 13 is oriented, as represented using a clock, approximately in a direction connecting 12 o'clock and 6 o'clock. In addition, in the case of the front left, the polarization axis 13*a* is oriented approximately in a direction connecting 1 o'clock and 7 o'clock, and in the case of the front right, the polarization axis 13*a* is oriented in a direction connecting 11 o'clock and 5 o'clock. This allows the image light 2 to be easily transmitted through the windshield 6, thereby improving the image quality of the image 4 projected onto the road surface 3 while suppressing reflection to the instrument panel 5 or the like.

Figure 8C:
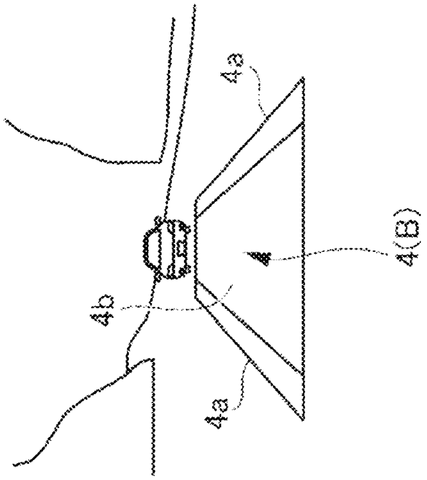
FIGS. 8A to 8C are diagrams illustrating examples of images projected by the projection device for vehicles.
Figure 8B:
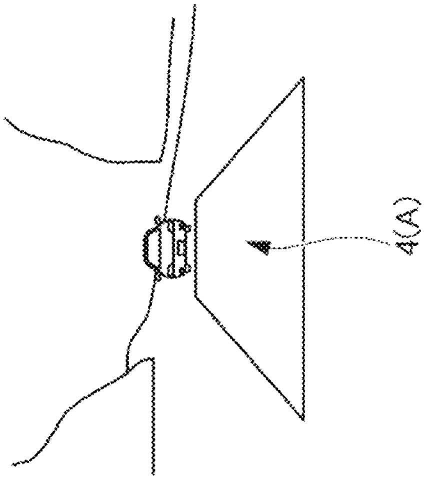
Figure 8A:
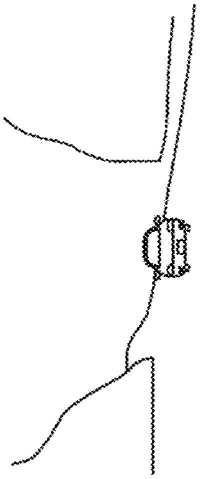

FIGS. 8A to 8C are diagrams illustrating examples of the image 4 projected by the projection device for vehicles 10. FIG. 8A is a diagram illustrating a state in which no image 4 is projected, FIG. 8B is a diagram illustrating a state in which a snowy road guide A is projected, and FIG. 8C is a diagram illustrating a state in which a snowy road guide B is projected. It is preferable that the projection device for vehicles 10 projects the image 4 indicating a drivable area of a snowy road. This allows the projection device for vehicles 10, which can suppress degradation of image quality, to project the image 4 indicating the drivable area onto the snowy road even in a situation where the lanes (white lines) on the road are buried in snow and cannot be distinguished allowing a driver to visually identify the drivable area of the snowy road. Thus, driving safety on a snowy road can be improved.

Examples of the image 4 for indicating a drivable area on a snowy road include the snowy road guide A illustrated in FIG. 8B and the snowy road guide B illustrated in FIG. 8C. The snowy road guide A is the image 4 that indicates the entire drivable area in the snowy road by using a single color and a fixed density. The snowy road guide B is the image 4 in which the left and right edge portions of the drivable area of the snowy road, which correspond to the lanes, are indicated by high-density lane images 4*a*, and the area between the left and right lane images 4*a* is indicated by a low-density fill image 4*b*. The fill image 4*b* may have a color different from that of the lane images 4*a*. These images 4 can be created using map information (including 3D maps) from a navigation system, vehicle position information based on GPS, vehicle attitude information based on a gyro sensor, or the like.

Figure 9:
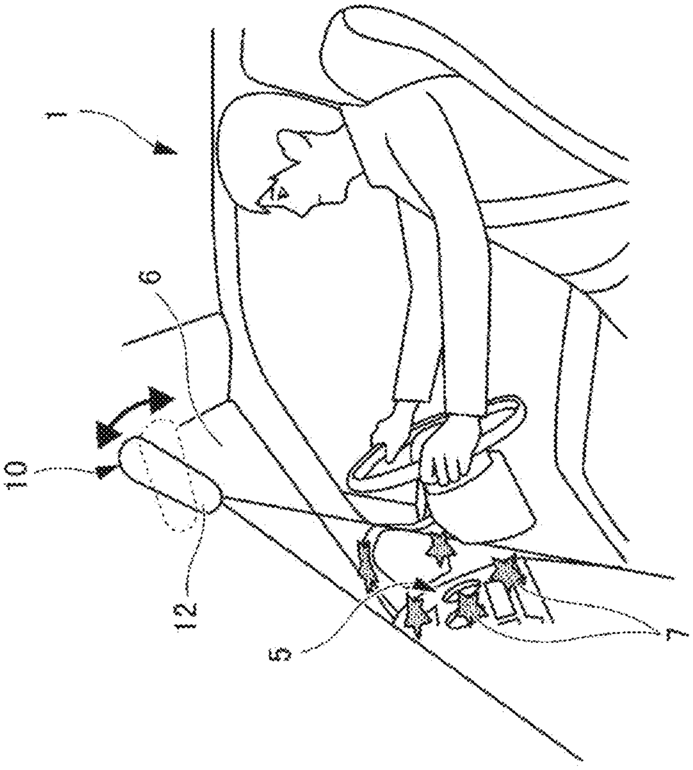
FIG. 9 is a diagram illustrating a variation of the projection device for vehicles.

FIG. 9 is a diagram illustrating a variation of the projection device for vehicles 10. In the variation of the projection device for vehicles 10 illustrated in FIG. 9, the projection direction of the image light 2 from the projection unit 12 is changeable. This allows switching between, for example, a first projection state for projecting the image light 2 to the outside of the vehicle through the windshield 6, to project the image 4 onto the road surface 3 outside the vehicle, and a second projection state for projecting the image light 2 to a location inside the vehicle to project the image 7 to the instrument panel 5 or the like inside the vehicle. Note that, when the image 7 is projected onto the instrument panel 5, the first projection state may be used.

Although each example has been described in detail above, the present invention is not limited to the specific examples, and various modifications and changes can be made without departing the scope of the claims. It is also possible to combine all or some of the components of the above-described examples.

REFERENCE SIGNS LIST

1 . . . Vehicle
10 . . . Projection device for vehicles
11 . . . Light source unit
12 . . . Projection unit
13 . . . Polarizing plate (polarizing member)
13*a* . . . Polarization axis
2 . . . Image light
3 . . . Road surface
4 . . . Image
4*a* . . . Lane image
4*b* . . . Fill image
5 . . . Instrument panel
6 . . . Windshield
7 . . . Image

The invention claimed is:

1. A projection device for vehicles for projecting image light from a vehicle to project an image based on the image light onto a road surface outside the vehicle, the projection device for vehicles comprising:

a projection unit that projects the image light, wherein the projection unit is disposed interiorly to a windshield of the vehicle, and projects the image light through the windshield to the outside of the vehicle to project the image onto the road surface outside the vehicle, and a projection direction of the image light from the projection unit is changeable and the projection unit is switchable between a first projection state for projecting the image light to the outside of the vehicle through the windshield, to project the image onto a road surface outside the vehicle, and a second projection state for projecting the image light to a location inside the vehicle to project the image to the location inside the vehicle.

2. The projection device for vehicles according to claim 1, wherein the image light is transmitted through a wiper wiping area in the windshield.

3. The projection device for vehicles according to claim 1, wherein the projection unit projects the image light through a polarizing member.

4. The projection device for vehicles according to claim 3, wherein the polarizing member is disposed to provide, as polarized image light, a P wave relative to the windshield.

5. The projection device for vehicles according to claim 3, wherein an orientation of a polarization axis of the polarizing member is changeable, and the polarizing member is switchable, based on changing the orientation of the polarization axis, between a first polarization state for polarizing the image light to provide a P wave relative to the windshield, and a second polarization state for polarizing the image light to provide an S wave relative to the windshield.

6. The projection device for vehicles according to claim 1, wherein the image indicates a drivable area of a road.

* * * * *